(12) United States Patent
Ji

(10) Patent No.: US 9,829,981 B1
(45) Date of Patent: Nov. 28, 2017

(54) HAPTIC OUTPUT DEVICE

(71) Applicant: Apple Inc., Cupertino, CA (US)

(72) Inventor: Qigen Ji, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/166,227

(22) Filed: May 26, 2016

(51) Int. Cl.
| | |
|---|---|
| *H04B 3/36* | (2006.01) |
| *G06F 3/01* | (2006.01) |
| *G06F 3/041* | (2006.01) |
| *G06F 3/044* | (2006.01) |

(52) U.S. Cl.
CPC .............. *G06F 3/016* (2013.01); *G06F 3/044* (2013.01); *G06F 3/0412* (2013.01); *G06F 3/0416* (2013.01)

(58) Field of Classification Search
CPC combination set(s) only.
See application file for complete search history.

(56) References Cited

U.S. PATENT DOCUMENTS

| | | | |
|---|---|---|---|
| 5,196,745 A | | 3/1993 | Trumper et al. |
| 5,293,161 A | | 3/1994 | MacDonald et al. |
| 5,424,756 A | | 6/1995 | Ho et al. |
| 5,434,549 A | | 7/1995 | Hirabayashi et al. |
| 5,436,622 A | | 7/1995 | Gutman et al. |
| 5,668,423 A | * | 9/1997 | You .......................... G08B 6/00 310/156.38 |
| 5,739,759 A | | 4/1998 | Nakazawa et al. |
| 6,084,319 A | | 7/2000 | Kamata et al. |
| 6,342,880 B2 | | 1/2002 | Rosenberg et al. |
| 6,373,465 B2 | | 4/2002 | Jolly et al. |
| 6,438,393 B1 | | 8/2002 | Surronen |
| 6,445,093 B1 | | 9/2002 | Binnard |
| 6,493,612 B1 | | 12/2002 | Bisset et al. |
| 6,693,622 B1 | | 2/2004 | Shahoian et al. |
| 6,777,895 B2 | * | 8/2004 | Shimoda ................ H02K 33/16 318/114 |
| 6,822,635 B2 | | 11/2004 | Shahoian |
| 6,864,877 B2 | | 3/2005 | Braun et al. |
| 6,952,203 B2 | | 10/2005 | Banerjee et al. |

(Continued)

FOREIGN PATENT DOCUMENTS

| | | |
|---|---|---|
| CN | 101036105 | 9/2007 |
| CN | 101409164 | 4/2009 |

(Continued)

OTHER PUBLICATIONS

Hasser et al., "Preliminary Evaluation of a Shape-Memory Alloy Tactile Feedback Display," Advances in Robotics, Mechantronics, and Haptic Interfaces, ASME, DSC-vol. 49, pp. 73-80, 1993.

(Continued)

*Primary Examiner* — Travis Hunnings
(74) *Attorney, Agent, or Firm* — Brownstein Hyatt Farber Schreck, LLP

(57) ABSTRACT

A haptic actuator is disclosed. The haptic actuator comprises a magnet, a conductor set apart from the magnet by a gap, and an actuator coupled to the magnet. The actuator is configured to move the magnet between a first position in which the conductor is subjected to, from the magnet, a first net magnetic flux having a first direction, and a second position in which the conductor is subjected to, from the magnet, a second net magnetic flux having a second direction different than the first direction.

20 Claims, 14 Drawing Sheets

(56) References Cited

U.S. PATENT DOCUMENTS

| | | | |
|---|---|---|---|
| 6,988,414 B2 | 1/2006 | Ruhrig et al. | |
| 7,068,168 B2 | 6/2006 | Girshovich et al. | |
| 7,080,271 B2 | 7/2006 | Kardach et al. | |
| 7,130,664 B1 | 10/2006 | Williams | |
| 7,234,379 B2 | 6/2007 | Claesson et al. | |
| 7,253,350 B2 | 8/2007 | Noro et al. | |
| 7,276,907 B2* | 10/2007 | Kitagawa | G01R 33/3806 248/633 |
| 7,323,959 B2 | 1/2008 | Naka et al. | |
| 7,339,572 B2 | 3/2008 | Schena | |
| 7,355,305 B2 | 4/2008 | Nakamura et al. | |
| 7,370,289 B1 | 5/2008 | Ebert et al. | |
| 7,392,066 B2 | 6/2008 | Hapamas | |
| 7,423,631 B2 | 9/2008 | Shahoian et al. | |
| 7,508,382 B2 | 3/2009 | Denoue et al. | |
| 7,570,254 B2 | 8/2009 | Suzuki et al. | |
| 7,656,388 B2 | 2/2010 | Schena et al. | |
| 7,667,691 B2 | 2/2010 | Boss et al. | |
| 7,675,414 B2 | 3/2010 | Ray | |
| 7,710,397 B2 | 5/2010 | Krah et al. | |
| 7,710,399 B2 | 5/2010 | Bruneau et al. | |
| 7,741,938 B2 | 6/2010 | Kramlich | |
| 7,755,605 B2 | 7/2010 | Daniel et al. | |
| 7,798,982 B2 | 9/2010 | Zets et al. | |
| 7,825,903 B2 | 11/2010 | Anastas et al. | |
| 7,855,657 B2 | 12/2010 | Doemens et al. | |
| 7,890,863 B2 | 2/2011 | Grant et al. | |
| 7,893,922 B2 | 2/2011 | Klinghult et al. | |
| 7,904,210 B2 | 3/2011 | Pfau et al. | |
| 7,919,945 B2 | 4/2011 | Houston et al. | |
| 7,952,261 B2 | 5/2011 | Lipton et al. | |
| 7,952,566 B2 | 5/2011 | Poupyrev et al. | |
| 7,956,770 B2 | 6/2011 | Klinghult et al. | |
| 7,976,230 B2 | 7/2011 | Ryynanen | |
| 8,002,089 B2 | 8/2011 | Jasso et al. | |
| 8,040,224 B2 | 10/2011 | Hwang | |
| 8,053,688 B2 | 11/2011 | Conzola et al. | |
| 8,063,892 B2 | 11/2011 | Shahoian | |
| 8,081,156 B2 | 12/2011 | Ruettiger | |
| 8,125,453 B2 | 2/2012 | Shahoian et al. | |
| 8,154,537 B2 | 4/2012 | Olien et al. | |
| 8,169,402 B2 | 5/2012 | Shahoian et al. | |
| 8,174,495 B2 | 5/2012 | Takashima et al. | |
| 8,217,892 B2 | 7/2012 | Meadors | |
| 8,232,494 B2 | 7/2012 | Purcocks | |
| 8,248,386 B2 | 8/2012 | Harrison | |
| 8,253,686 B2 | 8/2012 | Kyung | |
| 8,262,480 B2 | 9/2012 | Cohen et al. | |
| 8,265,292 B2 | 9/2012 | Leichter | |
| 8,265,308 B2 | 9/2012 | Gitzinger et al. | |
| 8,344,834 B2 | 1/2013 | Niiyama | |
| 8,345,025 B2 | 1/2013 | Seibert et al. | |
| 8,351,104 B2 | 1/2013 | Zaifrani et al. | |
| 8,378,797 B2 | 2/2013 | Pance et al. | |
| 8,378,965 B2 | 2/2013 | Gregorio et al. | |
| 8,384,316 B2 | 2/2013 | Houston et al. | |
| 8,390,218 B2 | 3/2013 | Houston et al. | |
| 8,390,594 B2 | 3/2013 | Modarres et al. | |
| 8,400,027 B2 | 3/2013 | Dong et al. | |
| 8,469,806 B2 | 6/2013 | Grant et al. | |
| 8,471,690 B2 | 6/2013 | Hennig et al. | |
| 8,493,177 B2 | 7/2013 | Flaherty et al. | |
| 8,493,189 B2 | 7/2013 | Suzuki | |
| 8,598,750 B2 | 12/2013 | Park | |
| 8,598,972 B2 | 12/2013 | Cho et al. | |
| 8,605,141 B2 | 12/2013 | Dialameh et al. | |
| 8,614,431 B2 | 12/2013 | Huppi et al. | |
| 8,619,031 B2 | 12/2013 | Hayward | |
| 8,624,448 B2 | 1/2014 | Kaiser et al. | |
| 8,633,916 B2 | 1/2014 | Bernstein et al. | |
| 8,639,485 B2 | 1/2014 | Connacher et al. | |
| 8,648,829 B2 | 2/2014 | Shahoian et al. | |
| 8,681,130 B2 | 3/2014 | Adhikari | |
| 8,717,151 B2 | 5/2014 | Forutanpour et al. | |
| 8,730,182 B2 | 5/2014 | Modarres et al. | |
| 8,749,495 B2 | 6/2014 | Grant et al. | |
| 8,754,759 B2 | 6/2014 | Fadell et al. | |
| 8,760,037 B2 | 6/2014 | Eshed et al. | |
| 8,773,247 B2 | 7/2014 | Ullrich | |
| 8,797,153 B2 | 8/2014 | Vanhelle et al. | |
| 8,803,670 B2 | 8/2014 | Steckel et al. | |
| 8,834,390 B2 | 9/2014 | Couvillon | |
| 8,836,502 B2 | 9/2014 | Culbert et al. | |
| 8,867,757 B1 | 10/2014 | Ooi | |
| 8,872,448 B2 | 10/2014 | Boldyrev et al. | |
| 8,878,401 B2 | 11/2014 | Lee | |
| 8,907,661 B2 | 12/2014 | Maier et al. | |
| 8,976,139 B2 | 3/2015 | Koga et al. | |
| 8,981,682 B2 | 3/2015 | Delson et al. | |
| 8,987,951 B2 | 3/2015 | Park | |
| 9,008,730 B2 | 4/2015 | Kim et al. | |
| 9,024,738 B2 | 5/2015 | Van Schyndel et al. | |
| 9,054,605 B2 | 6/2015 | Jung et al. | |
| 9,058,077 B2 | 6/2015 | Lazaridis et al. | |
| 9,086,727 B2 | 7/2015 | Tidemand et al. | |
| 9,104,285 B2 | 8/2015 | Colgate et al. | |
| 9,122,330 B2 | 9/2015 | Bau et al. | |
| 9,134,796 B2 | 9/2015 | Lemmons et al. | |
| 9,172,669 B2 | 10/2015 | Swink et al. | |
| 9,218,727 B2 | 12/2015 | Rothkopf et al. | |
| 9,256,287 B2 | 2/2016 | Shinozaki et al. | |
| 9,274,601 B2 | 3/2016 | Faubert et al. | |
| 9,280,205 B2 | 3/2016 | Rosenberg et al. | |
| 9,286,907 B2 | 3/2016 | Yang et al. | |
| 9,304,587 B2 | 4/2016 | Wright et al. | |
| 9,361,018 B2 | 6/2016 | Pasquero et al. | |
| 9,396,629 B1 | 7/2016 | Weber et al. | |
| 9,430,042 B2 | 8/2016 | Levin | |
| 9,436,280 B2 | 9/2016 | Tartz et al. | |
| 9,442,570 B2 | 9/2016 | Slonneger | |
| 9,449,476 B2 | 9/2016 | Lynn et al. | |
| 9,466,783 B2 | 10/2016 | Olien et al. | |
| 9,489,049 B2 | 11/2016 | Li | |
| 9,496,777 B2 | 11/2016 | Jung | |
| 9,501,149 B2 | 11/2016 | Burnbaum et al. | |
| 9,513,704 B2 | 12/2016 | Heubel et al. | |
| 9,535,500 B2 | 1/2017 | Pasquero et al. | |
| 9,539,164 B2 | 1/2017 | Sanders et al. | |
| 9,557,830 B2 | 1/2017 | Grant | |
| 9,600,037 B2 | 3/2017 | Pance et al. | |
| 9,632,583 B2 | 4/2017 | Virtanen et al. | |
| 2003/0117132 A1 | 6/2003 | Klinghult | |
| 2004/0174167 A1* | 9/2004 | Kitagawa | G01R 33/3806 324/318 |
| 2005/0036603 A1 | 2/2005 | Hughes | |
| 2005/0230594 A1 | 10/2005 | Sato et al. | |
| 2006/0209037 A1 | 9/2006 | Wang et al. | |
| 2006/0223547 A1 | 10/2006 | Chin et al. | |
| 2006/0252463 A1 | 11/2006 | Liao | |
| 2007/0106457 A1 | 5/2007 | Rosenberg | |
| 2007/0152974 A1 | 7/2007 | Kim et al. | |
| 2008/0062145 A1 | 3/2008 | Shahoian | |
| 2008/0084384 A1 | 4/2008 | Gregorio et al. | |
| 2008/0111791 A1 | 5/2008 | Nikittin | |
| 2009/0085879 A1 | 4/2009 | Dai et al. | |
| 2009/0115734 A1 | 5/2009 | Fredriksson et al. | |
| 2009/0166098 A1 | 7/2009 | Sunder | |
| 2009/0167702 A1 | 7/2009 | Nurmi | |
| 2009/0167704 A1 | 7/2009 | Terlizzi et al. | |
| 2009/0174672 A1 | 7/2009 | Schmidt | |
| 2009/0225046 A1 | 9/2009 | Kim et al. | |
| 2009/0243404 A1 | 10/2009 | Kim et al. | |
| 2009/0267892 A1 | 10/2009 | Faubert | |
| 2009/0313542 A1 | 12/2009 | Cruz-Hernandez et al. | |
| 2010/0116629 A1 | 5/2010 | Borissov et al. | |
| 2010/0225600 A1 | 9/2010 | Dai et al. | |
| 2010/0313425 A1* | 12/2010 | Hawes | A45D 26/00 30/44 |
| 2010/0328229 A1 | 12/2010 | Weber et al. | |
| 2011/0115754 A1 | 5/2011 | Cruz-Hernandez | |
| 2011/0128239 A1 | 6/2011 | Polyakov et al. | |
| 2011/0132114 A1 | 6/2011 | Siotis | |
| 2011/0205038 A1 | 8/2011 | Drouin et al. | |
| 2012/0062491 A1 | 3/2012 | Coni et al. | |

(56) References Cited

U.S. PATENT DOCUMENTS

| | | |
|---|---|---|
| 2012/0127071 A1 | 5/2012 | Jitkoff et al. |
| 2012/0127088 A1 | 5/2012 | Pance et al. |
| 2012/0223824 A1 | 9/2012 | Rothkopf |
| 2012/0235942 A1 | 9/2012 | Shahoian |
| 2012/0319827 A1 | 12/2012 | Pance et al. |
| 2012/0327006 A1 | 12/2012 | Israr et al. |
| 2013/0016042 A1 | 1/2013 | Makinen et al. |
| 2013/0044049 A1 | 2/2013 | Biggs et al. |
| 2013/0207793 A1 | 8/2013 | Weaber et al. |
| 2013/0278401 A1 | 10/2013 | Flaherty et al. |
| 2014/0125470 A1 | 5/2014 | Rosenberg |
| 2015/0097800 A1 | 4/2015 | Grant et al. |
| 2015/0116205 A1 | 4/2015 | Westerman et al. |
| 2015/0126070 A1 | 5/2015 | Candelore |
| 2015/0130730 A1 | 5/2015 | Harley et al. |
| 2015/0135121 A1 | 5/2015 | Peh et al. |
| 2015/0234493 A1 | 8/2015 | Parivar et al. |
| 2015/0277562 A1 | 10/2015 | Bard et al. |
| 2015/0338919 A1 | 11/2015 | Weber et al. |
| 2015/0349619 A1 | 12/2015 | Degner et al. |
| 2016/0011664 A1 | 1/2016 | Silvanto et al. |
| 2016/0328930 A1 | 11/2016 | Weber et al. |
| 2017/0003744 A1 | 1/2017 | Bard et al. |
| 2017/0024010 A1 | 1/2017 | Weinraub |

FOREIGN PATENT DOCUMENTS

| | | |
|---|---|---|
| CN | 101663104 | 3/2010 |
| CN | 101872257 | 10/2010 |
| EP | 1686776 | 8/2006 |
| EP | 2743798 | 6/2014 |
| JP | 2004129120 | 4/2004 |
| JP | 2004236202 | 8/2004 |
| JP | 2010537279 | 12/2010 |
| JP | 2010540320 | 12/2010 |
| KR | 20050033909 | 4/2005 |
| TW | 2010035805 | 10/2010 |
| WO | WO02/073587 | 9/2002 |
| WO | WO2006/091494 | 8/2006 |
| WO | WO2007/049253 | 5/2007 |
| WO | WO2007/114631 | 10/2007 |
| WO | WO2009/038862 | 3/2009 |
| WO | WO2010/129892 | 11/2010 |
| WO | WO2013/169303 | 11/2013 |
| WO | WO2014/066516 | 5/2014 |

OTHER PUBLICATIONS

Hill et al., "Real-time Estimation of Human Impedance for Haptic Interfaces," Stanford Telerobotics Laboratory, Department of Mechanical Engineering, Stanford University, 6 pages, at least as early as Sep. 30, 2009.

Lee et al, "Haptic Pen: Tactile Feedback Stylus for Touch Screens," Mitsubishi Electric Research Laboratories, http://wwwlmerl.com, 6 pages, Oct. 2004.

* cited by examiner

HAPTIC OUTPUT DEVICE

FIELD

The described embodiments relate generally to electronic devices, and more particularly to haptic output devices for electronic devices.

BACKGROUND

Modern electronic devices may use haptic or tactile outputs as one means of providing information to a user. Haptic outputs may be produced by applying a force, vibration, or motion to an electronic device. For example, a mobile phone may include a rotary motor with an eccentric weight that vibrates the device to alert the user to an incoming call or message. Haptic outputs may also be used to provide tactile feedback to a user, such as to mimic the feel of a button when a user presses on a touch sensitive surface of an electronic device, such as a touch screen or track pad.

SUMMARY

Some example embodiments are directed to a haptic actuator that comprises a magnet, a conductor set apart from the magnet by a gap, and an actuator coupled to the magnet. The actuator is configured to move the magnet between a first position in which the conductor is subjected to, from the magnet, a first net magnetic flux having a first direction, and a second position in which the conductor is subjected to, from the magnet, a second net magnetic flux having a second direction different than the first direction. In some embodiments, the magnet is a magnetic beam extending along a longitudinal axis, the conductor extends along an axis substantially parallel to the longitudinal axis, and the gap is oriented along a plane. In some embodiments, when an alternating current is applied to the conductor when the magnetic beam is in the first position, the conductor oscillates along an axis substantially parallel to the plane, and when the alternating current is applied to the conductor when the magnetic beam is in the second position, the conductor oscillates along an axis substantially perpendicular to the plane.

In some embodiments, when the magnetic beam is in the first position, the conductor is substantially centered relative to the longitudinal axis of the magnetic beam, and when the magnetic beam is in the second position, the conductor is off-center relative to the longitudinal axis of the magnetic beam.

In some embodiments, the haptic actuator comprises an array of magnetic beams each extending along a longitudinal axis, and a winding comprising a set of conductive segments each substantially parallel to the longitudinal axis of a respective magnetic beam. In some embodiments, the magnet is one of the magnetic beams of the array of magnetic beams, and the conductor is one of the conductive segments of the winding. In some embodiments, adjacent magnetic beams in the array of magnetic beams have opposite magnetic polarities. In some embodiments, the array of magnetic beams is a Halbach array.

In some embodiments, the haptic actuator further comprises a substrate, and the conductor is coupled to the substrate.

Some example embodiments are directed to an electronic device comprising a housing, a display within the housing, and a vibrator within the housing. The vibrator comprises a first actuation component, a second actuation component set apart from the first actuation component by a gap, a conductive winding coupled to one of the first or second actuation components, and an actuator configured to shift the second actuation component relative to the first actuation component. When the second actuation component is in a first position relative to the first actuation component, a first current applied to the conductive winding causes the first actuation component to oscillate along a first axis, and when the second actuation component is in a second position relative to the first actuation component, a second current applied to the conductive winding causes the first actuation component to oscillate along a second axis different than the first axis. The conductive winding may have a serpentine shape. The actuator may comprise a piezoelectric material.

In some embodiments, the electronic device further comprises a controller operatively coupled to the vibrator and configured to cause the first current to be applied to the conductive winding, cause the actuator to shift the second actuation component relative to the first actuation component, and cause the second current to be applied to the conductive winding.

In some embodiments, the conductive winding is coupled to the first actuation component, and the second actuation component comprises a magnet.

In some embodiments, the first actuation component is coupled to a first component of the electronic device via a first compliant member, and the second actuation component is coupled to a second component of the electronic device via a second compliant member. The first and second compliant members may comprise elastomeric sheets.

Some example embodiments are directed to a haptic actuator comprising a magnetic component comprising a set of magnets defining a first plane, and a conductive component defining a second plane substantially parallel to the first plane and comprising a set of conductive segments. The conductive component is positioned relative to the magnetic component such that each conductive segment is subjected to a net magnetic flux having a direction that is substantially parallel to the first and second planes to produce motion of at least one of the magnetic component or the conductive component in a direction substantially perpendicular to the first and second planes. In some embodiments, the conductive component comprises a substrate and a serpentine winding coupled to the substrate, and the conductive segments are portions of the serpentine winding. The serpentine winding may comprise a plurality of wires.

In some embodiments, each conductive segment is configured to carry an electrical current in a direction opposite an adjacent conductive segment, and adjacent magnets in the magnetic component have opposite magnetic polarities. Respective conductive segments may be substantially centered relative to a boundary between two respective magnets.

In some embodiments, the magnetic component further comprises a ferrous plate coupled to the set of magnets on a side of the magnetic component facing away from the conductive component.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
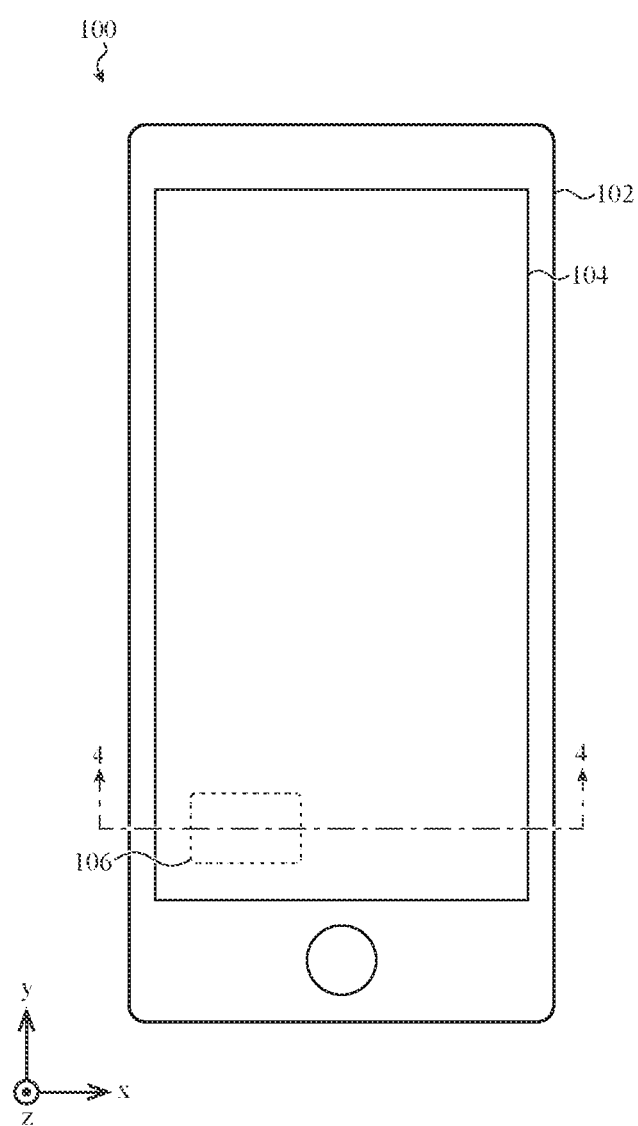
FIG. 1 shows an example electronic device incorporating a haptic actuator.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to an actuator that provides haptic feedback to a user of a device. In general, a haptic actuator may be configured to produce a mechanical movement or vibration that may be transmitted through an enclosure and/or an input device of an electronic device. In some cases, the movement or vibration is transmitted to the skin of a user and is perceived as a stimulus or haptic feedback by the user. In some embodiments, the haptic feedback may be coupled to an input action on an input device. One example of an input action is a touch or force input on a touch screen, track pad, or other touch sensitive input device. A physical movement or vibration from the haptic actuator can indicate to the user that the input action has been received or registered by the electronic device.

Haptic actuators can produce mechanical movements or vibrations in various ways. For example, a rotary motor may spin an eccentric weight to produce a vibration. As another example, a linear actuator may move or oscillate a mass along a linear path to produce a vibration. However, while such actuators may be able to vary the frequency and/or duration of oscillations, they are typically limited in the orientation or direction of physical responses that they can produce. For example, a rotating motor may rotate only around a single, defined axis, and a linear actuator may move only along one defined linear axis.

Haptic actuators as described herein produce motion along multiple different axes. More particularly, a haptic actuator in accordance with the present disclosure may include a conductive component, such as a coil or wire winding, and a magnetic component. By passing current through the conductive component while it is in proximity to the magnetic component, one or both of the conductive component and the magnetic component can be made to oscillate (or otherwise move relative to one another). The haptic actuators described herein also include an actuator or other mechanism that can change the relative positioning of the conductive component and the magnetic component. In particular, as described herein, the actuator may shift one or both of the conductive and magnetic components so that the electromagnetic interaction therebetween produces forces acting in different directions. The ability to change the direction of the forces allows the haptic actuator to produce movements along multiple different axes, such as orthogonal axes.

By producing motion along different axes, the haptic actuators described herein may provide different types of physical sensations and outputs, thus increasing the ways in which an electronic device can provide information to a user. For example, a vibration along one axis may indicate one type of event (e.g., an incoming call or message), while a vibration along a different axis may indicate a different type of event (e.g., a haptic feedback indicating that a touch input to a touch screen was detected). Moreover, in a given electronic device, different directions of movement may be suited for different output tasks. For example, an oscillation along an axis that is parallel with a touch screen of a device may produce a vibration that is more pronounced or more perceptible along the edge of the device, whereas an oscillation that is perpendicular to the touch screen may be more pronounced or more perceptible along the touch screen itself. Thus, haptic outputs that are in-plane with a touch screen may be used for event notifications, such as incoming calls or messages, while haptic outputs perpendicular to a plane or surface of a touch screen may be used to provide touch feedback, such as to signify detection of a touch event. Accordingly, a multi-axis haptic device can provide multiple different types of haptic output from a single device.

FIG. 1 shows one example of an electronic device 100 that may include a haptic actuator 106 configured to produce haptic outputs along different axes. Where the haptic actuator 106 is configured to or capable of producing oscillating or vibrating motions or forces, it may be described as a vibrator or a vibrating element. However, a vibrator or vibrating element is not necessarily limited to producing oscillations or vibrations, and may also produce non-oscillating motions (or motions with rapidly decaying oscillations). For example, instead of moving a mass back and forth multiple times, the mass may be moved in one direction and then stopped (or moved from a rest position to an actuated position and back to the rest position), thereby producing an "impulse." While an impulse may produce residual, decaying oscillations of the mass or other device components after the initial motion has ceased, it may not be perceived by a person holding the device as a vibration.

Figure 2:
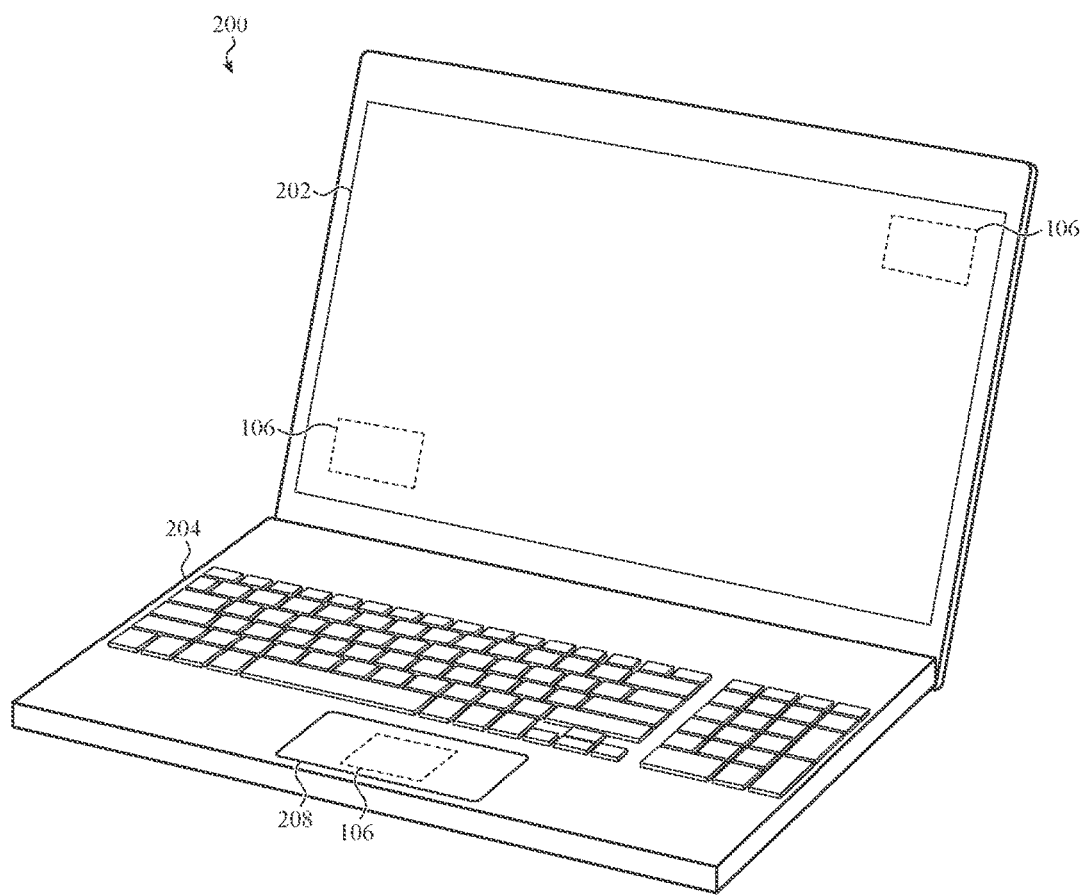
FIG. 2 shows an example electronic device incorporating a haptic actuator.
Figure 3:
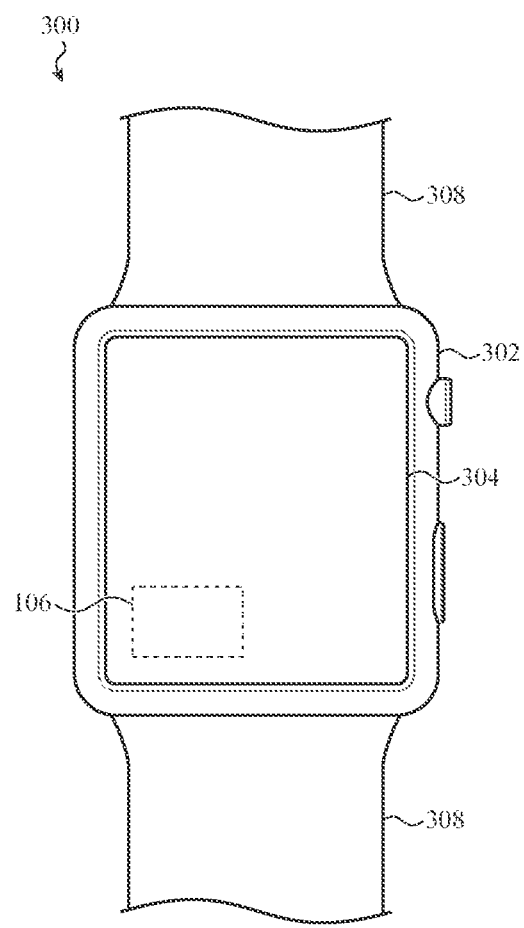
FIG. 3 shows an example electronic device incorporating a haptic actuator.

In the illustrated embodiment, the electronic device 100 is implemented as a handheld electronic device, such as a smartphone. A different type of electronic device can be used in other embodiments. For example, the electronic device can be a gaming device, a digital music player, a sports accessory device, a medical device, a health assistant, a tablet computing device, a notebook computer, a smart phone, and other types of electronic devices that provide, or are suitable to provide, haptic feedback to a user. FIGS. 2-3, discussed herein, show other examples of electronic devices that may include a haptic actuator.

The electronic device 100 includes a housing 102 and a display 104 within and/or coupled to the housing 102. The display 104 may include and/or be coupled to touch and/or force sensing components. Where the display 104 includes such components, it may be referred to as a touch screen or a touch sensitive surface. The electronic device 100 also includes a haptic actuator 106. The haptic actuator 106 may be within the housing 102 and may be coupled to any appropriate interior components of the electronic device 100, such as the housing 102, a component of the display 104, a battery (not shown), a circuit board (not shown), or any other appropriate component. As described herein, the haptic actuator 106 may produce motion along different axes, such as along an axis parallel to a surface of the display 104 and an axis perpendicular to the surface of the display 104.

FIG. 2 shows an example of an electronic device 200 that may include one or more haptic actuators 106. In the illustrated embodiment, the electronic device 200 is implemented as a laptop or notebook computer. The electronic device 200 includes a housing 204 and a display 202 within and/or coupled to the housing 204. The display 202 may include and/or be coupled to touch and/or force sensing components. Where the display 202 includes such components, it may be referred to as a touch screen or a touch sensitive surface. In embodiments where the display 202 is a touch screen, the electronic device 200 may include one or more haptic actuators 106 associated with the display 202 to provide haptic outputs to a user via the display 202.

The electronic device 200 may also include a touch- and/or force-sensitive input device, such as a trackpad 208, within and/or coupled to the housing 204. The trackpad 208 may receive and/or detect inputs to the electronic device 200, and may include or be coupled to a haptic actuator 106 to provide haptic outputs to a user via the surface of the trackpad 208.

FIG. 3 shows an example of an electronic device 300 that may include one or more haptic actuators 106. In the illustrated embodiment, the electronic device 300 is implemented as an electronic or smart watch that is adapted to be worn by a user. A different type of wearable electronic device can be used in other embodiments, such as a sports accessory device, a medical device, a health assistant, or any other appropriate wearable device. The electronic device 300 includes a housing 302 and a display 304 within and/or coupled to the housing 302. The display 304 may include and/or be coupled to touch and/or force sensing components (e.g., it may be a touch screen). The electronic device 300 may also include a band or strap 308 configured to couple the electronic device 300 to a body of a user, such as a wrist or arm.

The electronic device 300 also includes a haptic actuator 106. The haptic actuator 106 may provide haptic outputs via the display 304, such as outputs intended to be felt by a user's finger in contact with the display 304, as well as via the housing 302, such as outputs intended to be felt by a user's wrist or other body part to which the electronic device 300 is attached.

Figure 4:
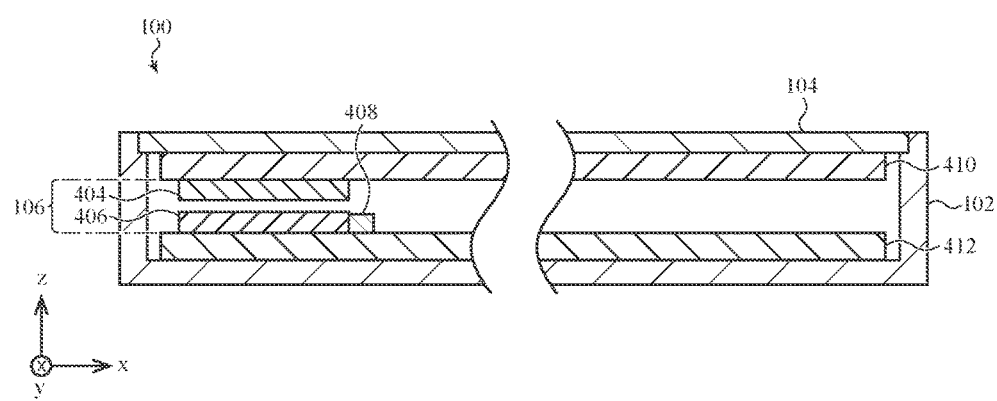
FIG. 4 shows a partial cross-sectional view of the device of FIG. 1.

FIG. 4 is a partial cross-section of the device 100 viewed along line 4-4 in FIG. 1. For clarity, some portions, components, or features of the device 100 are omitted from the view shown. While FIG. 4 shows the device 100, the figure and associated description may be similar to or representative of similar cross-sections of other devices as well, such as the devices 200, 300 shown above.

FIG. 4 shows one example configuration for integrating the haptic actuator 106 into an electronic device. The haptic actuator 106 includes a pair of actuation components 404, 406 set apart from one another by a gap. The actuation components 404, 406 may be substantially flat, plate-like components that define or include planar surfaces. Similarly, the gap may be defined by the planar surfaces of the actuation components 404, 406, and thus may be generally oriented along a plane.

The actuation components include magnetic and/or conductive components that together produce motion and/or forces to produce haptic outputs. In the haptic actuator 106, the actuation components include a conductive component 404 and a magnetic component 406. While the actuation components are described and illustrated as being generally flat or plate-shaped, this is merely one example shape, and actuation components may have other shapes, aspect ratios, sizes, etc.

As shown, the conductive component 404 is coupled to a first supporting structure 410 of the electronic device 100. The first supporting structure may be any internal component of the electronic device 100, such as a display stack, a circuit board, a cover glass or protective cover of a display, a portion of the housing 102, a force sensing structure, or the like. As shown in FIG. 4, the first supporting structure 410 corresponds to a display stack. The magnetic component 406 is coupled to a second supporting structure 412 of the electronic device 100. The second supporting structure 412 may be any internal component of the electronic device 100, such as a battery, circuit board, or a portion of the housing 102. As shown in FIG. 4, the second supporting structure 412 corresponds to a battery. In some cases, the relative locations of the conductive and magnetic components 404, 406 may be swapped, such that the conductive component 404 is coupled to the second supporting structure 412 and the magnetic component 406 is coupled to the first supporting structure 410. Other configurations are also contemplated.

The conductive component 404 and the magnetic component 406 are configured to interact via electromagnetic phenomena to move one or both of the components. More particularly, the magnetic component 406 may include permanent magnets or electromagnets that produce one or more magnetic fields. The conductive component 404 may include one or more current carrying conductors, such as wires, conductive traces, coils, windings, or the like, that are subjected to the magnetic field(s) produced by the magnetic component 406. When a current is passed through the conductors in the conductive component 404, the interaction between the current carrying conductors and the magnetic field(s) produces a force (e.g., a Lorentz force) that causes one or both of the conductive component 404 and the magnetic component 406 to move relative to the other. The direction of the force, and thus the motion, is influenced by the particular alignment of the conductors relative to the magnetic fields, as described herein.

The haptic actuator 106 also optionally includes an actuator 408 that moves or shifts the magnetic component 406 relative to the conductive component 404. As described herein, by shifting the magnetic component 406 relative to the conductive component 404, the haptic actuator 106 can produce motion along different axes. For example, when the magnetic component 406 is in a first position relative to the conductive component 404, the haptic actuator 106 may produce motion that is substantially parallel to the display 104. When the magnetic component 406 is in a second position relative to the conductive component 404, the haptic actuator 106 may produce motion that is substantially perpendicular to the display 104.

The actuator 408 may be a solenoid or other electromechanical linear actuator. In such cases, an actuator arm or shaft (or other translating member) is coupled to or otherwise in contact with the magnetic component 406. When actuated, the actuator arm pushes or pulls the magnetic component 406 to move the magnetic component 406. In some cases, the actuator 408 may be or may include a piezoelectric material that expands or contracts in response to an applied electric field or electric current in order to move the magnetic component 406. For example, the actuator 408 may be a block of piezoelectric material that abuts or is coupled to a side of the magnetic component 406 to push or pull the magnetic component 406 to shift the component a desired distance and direction.

While the instant disclosure shows the actuator 408 configured to move the magnetic component 406, it will be understood that it could instead be coupled to the conductive component 404 to move the conductive component 404 relative to the magnetic component 406. This configuration may achieve the same or similar results as moving the magnetic component 406. In some cases, the magnetic component 406 and the conductive component 404 may each be coupled to a different actuator.

FIG. 4 shows the conductive and magnetic components 404, 406 coupled to components of the electronic device. In other embodiments, the haptic actuator 106 may include its own housing distinct from the housing of the electronic device. For example, a haptic actuator 106 may be assembled into a modular haptic actuator unit including the conductive and magnetic components 404, 406 and the optional actuator 408 positioned within a housing. The housing of the modular unit may then be inserted in, coupled to, or otherwise integrated with an electronic device. Such configurations remove the necessity of coupling or mounting each discrete component of the haptic actuator to the internal components of the electronic device.

Figure 5A:
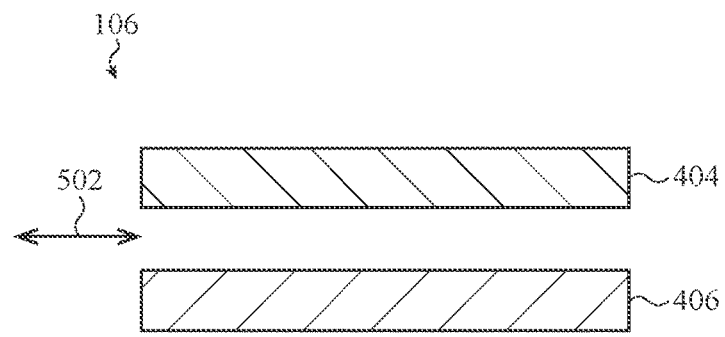
FIGS. 5A-5B show partial cross-sectional views of components of an example haptic actuator of FIG. 1.
Figure 5B:
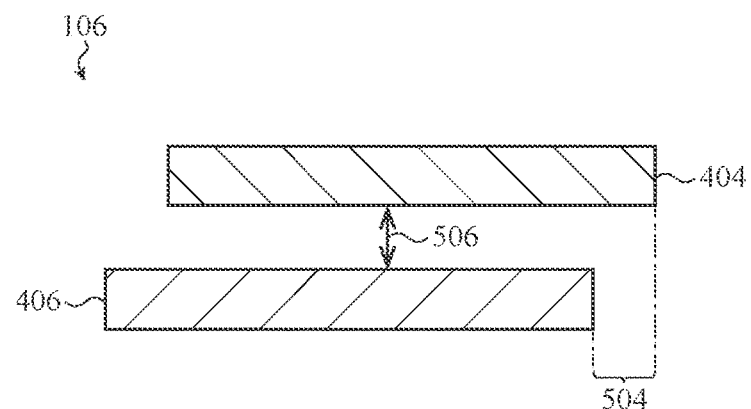

FIGS. 5A-5B are partial cross-sections of the haptic actuator 106, illustrating the shifting of the magnetic component 406 relative to the conductive component 404 to produce motion along different axes. Movements or vibrations along different axes or different directions may be referred to herein as different haptic modes or simply different modes. Some components of the haptic actuator 106 are omitted from FIGS. 5A-5B for clarity.

FIG. 5A illustrates the haptic actuator 106 when the magnetic component 406 is in a first position relative to the conductive component 404. In the first position, the magnetic component 406 may be in a rest or unactuated position (e.g., an actuator coupled to the magnetic component 406 is unactuated), and the conductive component 404 and the magnetic component 406 may be substantially aligned. The conductive component 404 and the magnetic component 406 may be considered to be aligned when the conductors of the conductive component 404 are aligned with (e.g., centered with respect to) corresponding magnets of the magnetic component 406. This alignment is described and illustrated in greater detail with respect to FIGS. 8A-8B. When the magnetic component 406 is in the first position relative to the conductive component 404 and a current is applied to the conductive component 404, the haptic actuator 106 may produce forces along an axis indicated by arrow 502, namely, forces that tend to increase or decrease the distance between the conductive component 404 and the magnetic component 406.

FIG. 5B illustrates the haptic actuator 106 when the magnetic component 406 is in a second position relative to the conductive component 404. In the second position, the magnetic component 406 may be offset from the conductive component 404 by a distance 504. The offset distance 504 may align the conductors of the conductive component 404 with a boundary, joint, or seam between two corresponding magnets of the magnetic component 406. This alignment is described and illustrated in greater detail with respect to FIGS. 9A-9B. When the magnetic component 406 is in the second position relative to the conductive component 404 and a current is applied to the conductive component 404, the haptic actuator 106 may produce forces along an axis indicated by arrow 506, namely, forces that tend to move the conductive component 404 and the magnetic component 406 relative to one another along a plane defined by the gap between the components. In other words, the forces do not substantially change the distance of the gap between the conductive component 404 and the magnetic component 406.

Figure 6A:
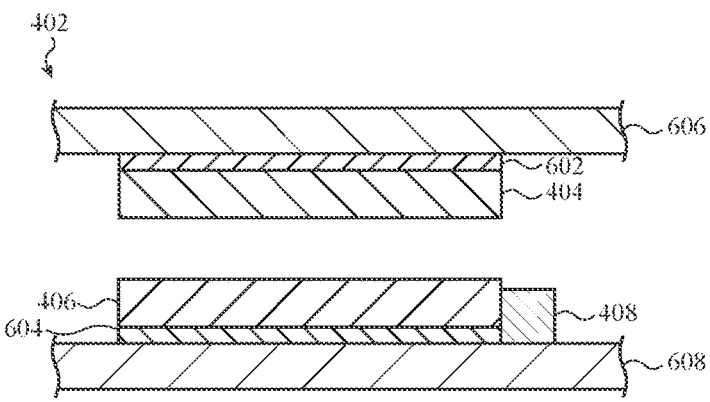
FIGS. 6A-6C show partial cross-sectional views of the haptic actuator of FIG. 1.
Figure 6B:
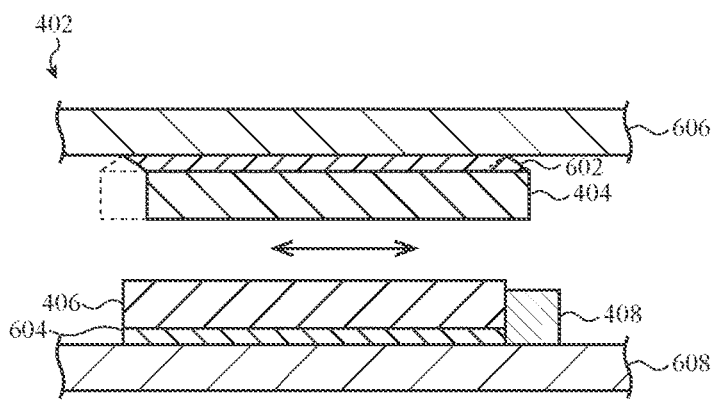
Figure 6C:
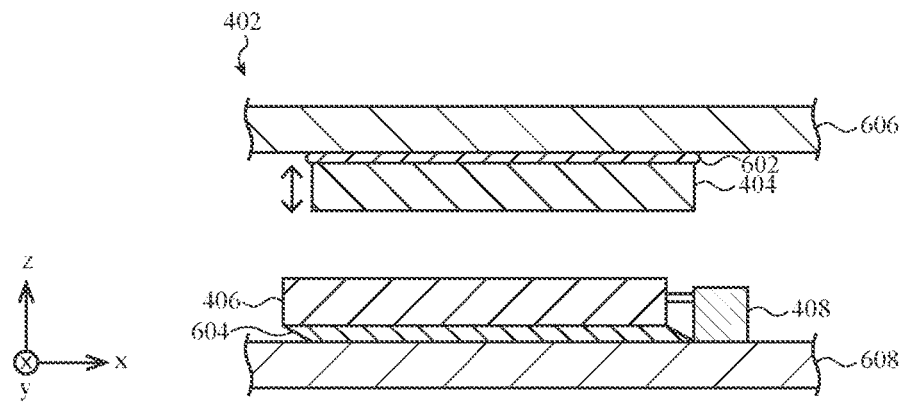

In order to allow the actuator 408 to move the magnetic component 406 between the first and the second position, and to allow the conductive component 404 and/or the magnetic component 406 to move to produce a haptic output, the conductive and magnetic components 404, 406 may be coupled to supporting structures via a compliant coupling. FIGS. 6A-6C are partial cross-sectional views showing the haptic actuator 106 coupled via compliant couplings to first and second supporting structures 606, 608. Some components of the haptic actuator 106 are omitted from FIGS. 6A-6C for clarity. The supporting structures 606, 608 may be components of an electronic device. For example, the first supporting structure 606 may correspond to a display stack of an electronic device, and the second supporting structure 608 may correspond to a battery of the electronic device, as described with respect to FIG. 4. Alternatively, the first and second supporting structures 606, 608 may be parts of an electronic device housing, or parts of a housing for a modular or pre-assembled actuator, as described above.

The conductive component 404 may be coupled to the first supporting structure 606 via a first compliant member 602. The first compliant member 602 may allow the conductive component 404 to move in one or more directions relative to the first supporting structure 606. For example, the first compliant member 602 may allow the conductive component 404 to move parallel to the X axis, as shown in FIG. 6B, as well as parallel to the Z axis, as shown in FIG. 6C. Because the first compliant member 602 couples the conductive component 404 to the first supporting structure 606, the motion of the conductive component 404 imparts a force to the first supporting structure 606. This force may be ultimately translated to a housing or other component of an electronic device to produce a haptic output that is perceptible by a user.

The magnetic component 406 may be coupled to the second supporting structure 608 via a second compliant member 604. The second compliant member 604 may allow the magnetic component 406 to move between a first and a second position in response to the actuator 408 applying a force to the magnetic component 406. For example, as shown in FIGS. 6A-6B, the magnetic component 406 is in a first position in which the actuator 408 is at rest and the second compliant member 604 is not deformed. FIG. 6C illustrates the magnetic component 406 after it has been moved from the first to the second position by the actuator 408. As shown in FIG. 6C, the second compliant member 604 has deformed to allow the magnetic component 406 to move to the second position.

As described herein, when the magnetic component 406 is in the second position, applying a current to a conductor of the conductive component 404 causes the conductive component 404 to move in a different direction than when the magnetic component 406 is in the first position (e.g., parallel to the Z axis instead of parallel to the X axis, as shown in FIG. 6).

The compliant members 602, 604 may be configured to return the conductive and magnetic components 404, 406 to a neutral or rest position when no forces are acting on them. For example, when the actuator 408 is not applying a force to the magnetic component 406, the second compliant member 604 may return the magnetic component 406 to the first position. Also, when there is no current flowing in the conductive component 404 (and hence the conductive component 404 is not moving or oscillating), the first compliant member 602 may return the conductive component 404 to a neutral position in which it is substantially aligned with the magnetic component 406. Moreover, the compliant members 602, 604 may facilitate or permit motion of the conductive and magnetic components 404, 406 both in plane (e.g., corresponding to motion along the X axis, or motion that is substantially parallel to a plane defined by the gap between the conductive and magnetic components 404, 406), and out of plane (e.g., corresponding to motion along the Z axis, or motion that is substantially perpendicular to the plane defined by the gap).

The compliant members 602, 604 may be formed from or include any appropriate material or materials, such as a foam, polymer, gel, adhesive, or the like. In some embodiments, the compliant members 602, 604 are elastomeric sheets (e.g., foam pads) that are glued or otherwise bonded to the conductive and magnetic components 404, 406 and the supporting structures 606, 608.

Other components, layers, mechanisms, or materials may be used instead of or in addition to the compliant members 602, 604. For example, instead of a single sheet, as shown in FIGS. 6A-6C, multiple discrete compliant pads may couple the components 404, 406 to the supporting structures 606, 608, such as a discrete pad at each corner of the components 404, 406. As another example, one or more bearings (e.g., journal bearings or ball bearings), bushings, clips, guides, slides, tracks, springs (e.g., coil springs, plate springs, wave springs, or leaf springs), or the like may be used to couple the conductive and magnetic components 404, 406 to the supporting structures 606, 608 while also allowing for adequate movement of the components. Where other structures are used instead of (or in addition to) the compliant members 602, 604, those structures may be coupled to other portions of the conductive and magnetic components 404, 406, such as the edges of the components, or the facing surfaces of the components (e.g., the surfaces that define the gap between the components).

Figure 7:
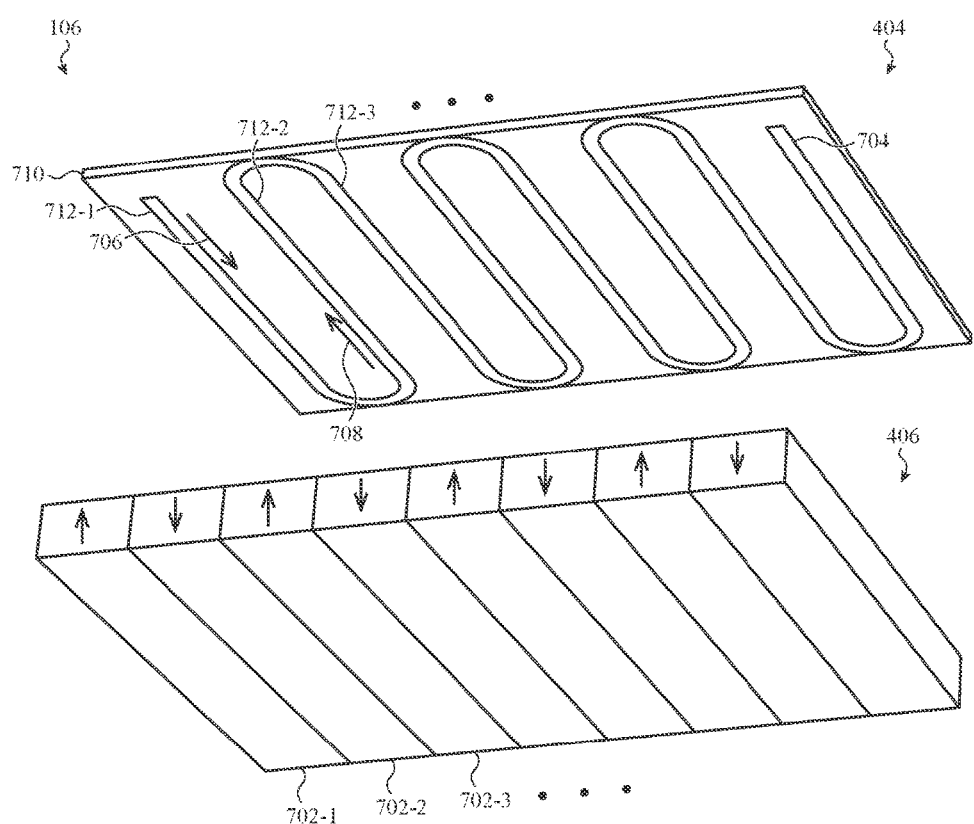
FIG. 7 shows a partial exploded view of the haptic actuator of FIG. 1.

FIG. 7 shows a partial exploded view of the haptic actuator, showing details of an example configuration of the conductive component 404 and the magnetic component 406. As shown, the conductive component 404 and the magnetic component 406 are generally planar (e.g., they have or define one or more substantially planar surfaces), are positioned substantially parallel to each other, and are separated by a gap.

The conductive component 404 includes a conductor 704 coupled to or otherwise incorporated with a substrate 710. The conductor 704 may be any appropriate conductive material or component. For example, the conductor 704 may be a conductive winding including one or more wires (as shown and described with respect to FIGS. 10A-10C), a trace of conductive material (e.g., indium tin oxide, copper, or gold) deposited on or in a substrate, or the like.

The substrate 710 may be formed from or include any appropriate material. For example, the substrate 710 may be a circuit board, a polymer (such as an epoxy), or the like. The conductor 704 may be coupled to or otherwise integrated with the substrate 710 in any appropriate way. For example, the substrate 710 may be a circuit board and the conductor 704 may be a conductive trace deposited on or in the circuit board. As another example, a conductive winding may be glued, bonded, or otherwise coupled to the substrate 710. As yet another example, the substrate 710 may be formed by encapsulating the conductor 704, such as a conductive winding, in a material. More particularly, a conductive winding may be positioned in a mold and an epoxy (or other curable material) may be introduced into the mold. The epoxy may be cured to form the substrate 710 with the conductor 704 embedded and/or encapsulated therein. Where the conductor 704 is embedded in the substrate 710 as described above, the substrate 710 may be referred to as a matrix.

The conductor 704 may comprise a set of conductive segments. In the illustrated embodiment, the conductive segments correspond to the parallel portions of the conductor 704. In particular, as shown in FIG. 7, the conductor 704 is a serpentine winding that has several substantially parallel segments 712. Due to the serpentine shape of the winding, when a current is applied to the winding, the direction of the current through each conductive segment is opposite an adjacent conductive segment. For example, when a current is passed through the winding, the current may flow through a first segment 712-1 in a first direction 706, and through a second segment 712-2 in a second, opposite direction 708. The alternation of the current directions through adjacent segments 712 of the conductor 704 allows each conductive segment 712 to interact with a magnetic field from the magnetic component 406 such that Lorentz forces experienced by the conductive segments are all in substantially the same direction, as described with respect to FIGS. 8A-9B.

The magnetic component 406 may include one or more magnets, such as permanent magnets, electromagnets, or any other component(s) that produce magnetic fields of sufficient strength, size, directionality, etc., to produce the haptic outputs described herein. As shown in FIG. 7, the magnetic component 406 includes a set of magnetic beams 702 formed into an array. In FIG. 7, each magnetic beam 702 extends along a longitudinal axis, though other magnet shapes and configurations are also possible. In some embodiments, each respective magnetic beam 702 in the magnetic component 406 corresponds to a respective conductive segment 712 of the conductive component 404. That is, there may be the same number of magnetic beams 702 as conductive segments 712. Of course, other configurations are also possible. For example, the magnetic component 406 may be or may include a Halbach array in which multiple magnets or magnetic beams are positioned relative to one another to produce a desired magnetic field or set of magnetic fields. More particularly, the Halbach array may produce one or more magnetic fields that propagate from the surface of the array that is facing the conductive component 404, but do not substantially propagate from the opposite (e.g., the back) surface of the array. Regardless of the particular configuration of the magnets, magnetic beams, or other components of the magnetic component 406, the magnetic component 406 may produce one or more magnetic fields that interact with the conductive segments 712 of the conductive component 404 to produce Lorentz forces on the conductive segments 712.

The magnetic beams 702, or other magnets or magnetic components of the magnetic component 406, may be configured such that adjacent magnetic beams 702 have alternating magnetic polarities. For example, as shown in FIG. 7, the magnetic beam 702-1 has a first polarity (e.g., a north pole facing the conductive component 404 and a south pole facing away from the conductive component 404). The magnetic beam 702-2 adjacent the magnetic beam 702-1 has a second, opposite, polarity, with its south pole facing the conductive component 404 and its north pole facing away from the conductive component 404. (For ease of illustration, the polarities of magnets are indicated in the figures by arrows within the magnet.) The magnetic poles of the magnetic beams 702 may be consistent along their longitudinal axes, such that the magnetic field produced by a given magnetic beam 702 is substantially consistent in shape, size, and/or strength, along its length from one end to the other end.

Where the magnetic component 406 is or includes a Halbach array (or another type of array or set of magnets or magnetic components), adjacent magnets need not have opposite magnetic polarities. In such cases, the Halbach array may be configured to produce adjacent magnetic fields that extend along a longitudinal axis that have opposite polarities, regardless of the particular magnet configuration. Moreover, in such configurations, the adjacent magnetic fields may each correspond to several magnets or magnetic components.

In the haptic actuator 106, adjacent magnetic fields have opposite polarities so that the relative relationship between the current direction and the magnetic field polarity for each magnetic field/conductive segment pair is the same. In particular, and as described herein, the electromagnetic forces (e.g., Lorentz forces) that are produced on a conducting wire in a magnetic field depend on the direction of the electrical current through the conductor and the direction of the magnetic flux to which the conductor is subjected. Thus, because an electrical current through the conductor 704 will travel in an opposite direction in each adjacent conductive segment 712, in order to produce forces that act in the same direction (instead of acting in opposite directions that will cancel each other out), the polarities of adjacent magnetic beams 702 are opposite to each other.

Other configurations of conductors and magnets (or magnetic fields produced by the magnetic component 406) are also possible. For example, a conductor 704 may be configured such that current through adjacent conductive segments travels in the same direction. In such cases, the magnets (or magnetic fields) of the magnetic component 406 that correspond to those conductive segments may have substantially the same polarities. Indeed, for any shape or configuration of a conductor, a magnetic component 406 may be configured to produce magnetic fields that produce the desired forces on the conductor (e.g., such that the forces on each operative portion of the conductor are in the same direction for a given current).

Figure 8A:
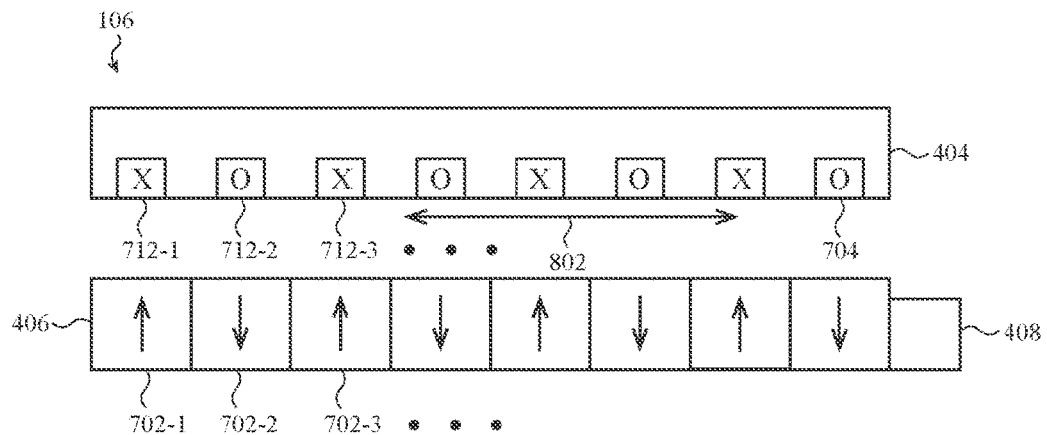
FIGS. 8A-8B show partial cross-sectional views of the haptic actuator of FIG. 1.
Figure 8B:
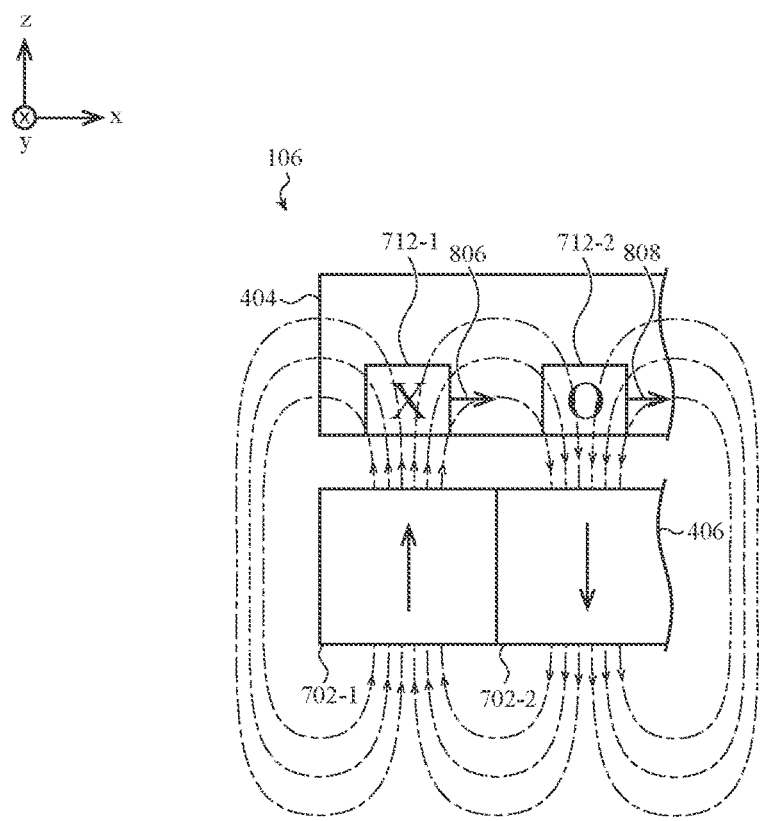

FIGS. 8A-8B are partial cross-sectional views of the haptic actuator 106 viewed along line 4-4 in FIG. 1, showing the relationship between the current directions in the conductive segments 712 of the conductive component 404 and the polarities of the magnets and/or magnetic fields of the magnetic component 406. Some components of the haptic actuator 106 are omitted from FIGS. 8A-8B for clarity. Also, cross-hatching is omitted from these figures to avoid obfuscating other aspects of the figures.

As shown in FIG. 8A, the conductor 704 is embedded in or otherwise coupled to the substrate 710 (FIG. 7). The "X" or "O" in each conductive segment 712 indicates the direction of electrical current through the conductive segments 712 at a given time, with "X" representing current moving into the page and "O" representing current moving out of the page. As described further with respect to FIG. 8B, the relative positions of the conductive segments 712 and the magnetic beams 702 shown in FIG. 8A configure the haptic actuator 106 to produce motion that is substantially parallel to the planes defined by the conductive and magnetic components 404, 406 (and/or substantially parallel to the gap formed therebetween), as illustrated by arrow 802.

FIG. 8B shows portions of the conductive and magnetic components 404, 406, illustrating how the interaction between the magnetic fields produced by the magnetic component 406 produce a force on the conductor 704 of the conductive component 404. In particular, the magnetic beams 702-1, 702-2 propagate magnetic fields, as represented in the figures by dashed flux lines. The flux lines include arrows indicating the direction of the magnetic field at a given location.

The conductive segments 712-1, 712-2 are positioned relative to the magnetic beams 702-1, 702-2 such that the conductive segments 712 are each subjected to a net magnetic flux in a substantially opposite direction. In particular, the first conductive segment 712-1 is subjected to a net magnetic flux having a first direction (e.g., a positive Z direction), and the second conductive segment 712-2 is subjected to a net magnetic flux having a second direction (e.g., a negative Z direction). In the embodiment shown in the figures, these particular flux directions are achieved when the conductive segments 712 are substantially centered relative to the longitudinal axes of the magnetic beams 702. For example, longitudinal axes of the conductive segments 712 are each parallel to the longitudinal axes of corresponding magnetic beams 702, and are positioned substantially directly above the longitudinal axes of the corresponding magnetic beams 702. That is, the longitudinal axes of the conductive segments 712 and the longitudinal axes of corresponding magnetic beams 702 define a plane that is substantially parallel to the Z-Y plane.

Lorentz forces are forces that are exerted on charged particles moving through a magnetic field. Where a charge is passed through a conductor, such as the conductive segments 712, the Lorentz forces act on the conductor itself. The direction of a Lorentz force on a conductor depends on the relative directions of the current and the magnetic field through which the current is propagating. Thus, returning to FIG. 8B, the electric current is shown moving through the conductive segment 712-1 in a positive Y direction (e.g., into the page), and the conductive segment 712-1 is subjected to a net magnetic field in positive Z direction. Thus, the resulting force 806 acting on the conductive segment 712-1 is in a positive X direction (e.g., to the right). Similarly, the current is moving through the conductive segment 712-2 in a negative Y direction (e.g., out of the page) and the conductive segment 712-2 is subjected to a net magnetic field in a negative Z direction. Thus, the resulting force 808 acting on the conductive segment 712-2 is also in a positive X direction (e.g., to the right). On the other hand, if the current moving through the conductive segments 712-1, 712-2 were in the same direction (and the magnetic beams 702 were positioned as shown in FIG. 8B), the forces acting on the conductive segments would be in opposite directions, and would substantially cancel each other out. Accordingly, by configuring the magnetic beams 702 (or other magnets or magnetic components) and the conductive segments 712 as described herein, the net forces acting on the conductive segments 712 will act in substantially the same or parallel directions, and thus move the conductive component 404 relative to the magnetic component 406 to produce haptic outputs.

As noted above, the haptic actuator 106 may produce vibrations by passing an alternating current through the conductor (or by otherwise switching the direction of the current through the conductor 704). Because the direction of the current through the conductor 704 changes but the directions and/or polarities of the magnetic fields produced by the magnetic component 406 do not, the direction of the forces acting on the conductive segments 712 will change each time the direction of the current changes. More particularly, the forces on the conductor 704 will reverse direction each time the current reverses direction, thus causing the conductive component 404 to oscillate along the X axis (e.g., along an axis substantially parallel to the plane defined by the conductive and magnetic components 404, 406, and/or parallel to the generally planar gap that separates the conductive and magnetic components 404, 406).

Where non-oscillating or non-vibrating motions are desired, such as to produce a haptic impulse or "pop," a current can be passed through the conductor 704 in only a single direction. This will produce a Lorentz force in only a single direction, such as along the positive or negative X axis. While a series of substantially equal oscillating forces may not be produced in such cases, the haptic actuator 106 may still oscillate or vibrate in response to the production of a force in a single direction. For example, as the current is removed and the Lorentz force ceases, the conductive component 404 oscillate due to the resilience of the compliant member 602, until the oscillations decay as a result of the inherent damping properties of the compliant member 602 (FIGS. 6A-6C).

Figure 9A:
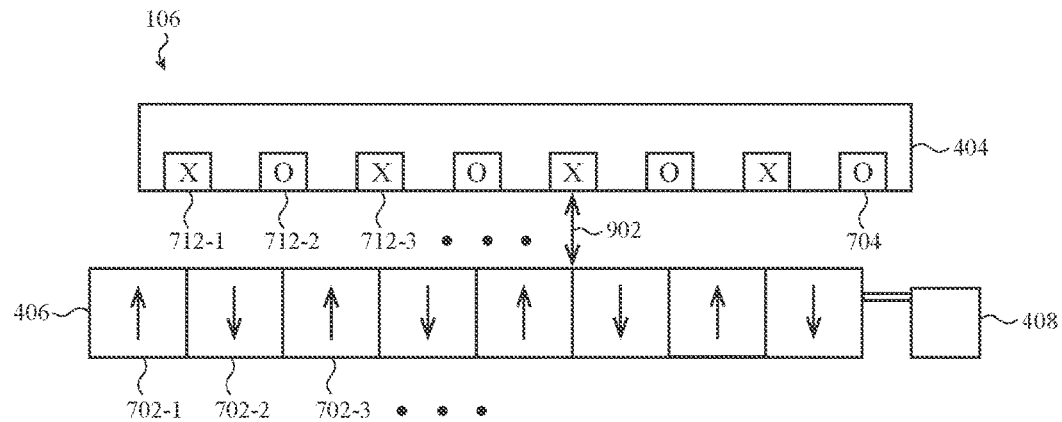
FIGS. 9A-9B show partial cross-sectional views of the haptic actuator of FIG. 1.
Figure 9B:
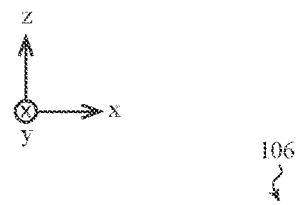
Figure 9B:
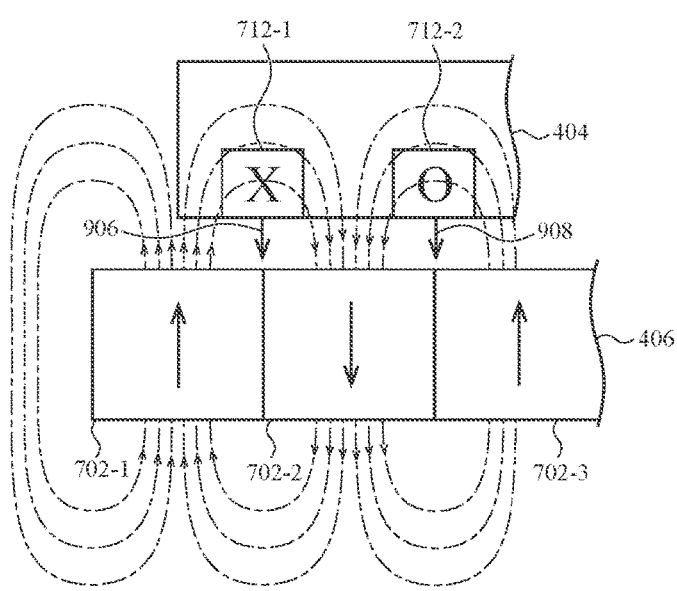

FIGS. 9A-9B are partial cross-sectional views of the haptic actuator 106 viewed along line 4-4 in FIG. 1, showing the relationship between the current directions in the conductive segments 712 and the polarities of the magnetic beams 702 after the actuator 408 has shifted the magnetic component 406 relative to the conductive component 404. Some components of the haptic actuator 106 are omitted from FIGS. 9A-9B for clarity. Also, cross-hatching is omitted from these figures to avoid obfuscating other aspects of the figures.

The relative positions of the conductive segments 712 and the magnetic beams 702 shown in FIG. 9A configure the haptic actuator 106 to produce motion that is substantially perpendicular to the planes defined by the conductive and magnetic components 404, 406 (and/or substantially parallel to the gap formed therebetween), as illustrated by arrow 902. In particular, the conductive segments 712-1, 712-2 are positioned relative to the magnetic beams 702-1, 702-2 such that the conductive segments 712 are each subjected to a net magnetic flux in a substantially opposite direction. In particular, the first conductive segment 712-1 is subjected to a net magnetic flux having a first direction (e.g., a positive X direction), and the second conductive segment 712-2 is subjected to a net magnetic flux having a second direction (e.g., a negative X direction).

In the embodiment shown in the figures, these particular flux directions are achieved when the conductive segments 712 are off-center relative to the longitudinal axes of the magnetic beams 702. For example, longitudinal axes of the conductive segments 712 are each parallel to the longitudinal axes of corresponding magnetic beams 702, but are offset from the magnetic beams 702. That is, the longitudinal axes of the conductive segments 712 and the longitudinal axes of corresponding magnetic beams 702 define a plane that is not parallel to the Z-Y plane. In some cases, the magnetic component 406 is shifted such that the longitudinal axes of the conductive segments 712 are substantially centered with respect to a boundary or joint between two respective magnetic beams 702 (e.g., the boundary or joint between the magnetic beams and the corresponding conductor define a plane substantially parallel to the Z-Y plane).

FIG. 9B illustrates the relative directions of the electric current, magnetic field, and Lorentz forces that produce motion along an axis different than that described with respect to FIG. 8B. In particular, in FIG. 9B, the electric current is moving through the conductive segment 712-1 in a positive Y direction, and the conductive segment 712-1 is subject to a net magnetic field in a positive X direction. Thus, the resulting force 906 acting on the conductive segment 712-1 is in a negative Z direction. Similarly, the electric current is moving through the conductive segment 712-2 in a negative Y direction, and the conductive segment 712-2 is subject to a net magnetic field in a negative X direction. Thus, the resulting force 908 acting on the conductive segment 712-2 is also in the negative Z direction.

As noted above, the haptic actuator 106 may produce vibrations by passing an alternating current through the conductor (or by otherwise switching the direction of the current through the conductor 704), which causes the direction of the Lorentz forces to alternate. When the haptic actuator 106 is positioned as shown in FIGS. 9A-9B, the relative positioning of the conductive component 404 and the magnetic component 406 will cause the conductive component 404 to oscillate along the Z axis (e.g., substantially perpendicular to a plane defined by the conductive or magnetic components 404, 406, and/or perpendicular to the generally planar gap that separates the conductive and magnetic components 404, 406). Where non-oscillating or non-vibrating motions are desired, such as to produce a haptic impulse or "pop," a current can be passed through the conductor 704 in only a single direction. This will produce a Lorentz force in only a single direction, such as along the positive or negative Z axis.

Figure 10A:
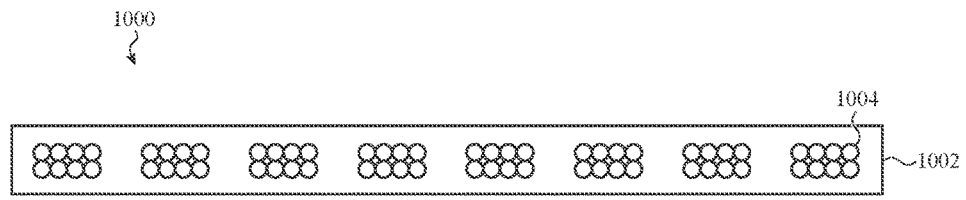
FIG. 10A shows a partial cross-sectional view of a conductive component of the haptic actuator of FIG. 1.

FIG. 10A shows a cross-section of an example conductive component 1000. The conductive component 1000 may be similar to, or may be an embodiment of, the conductive component 404 described above. In the conductive component 1000, the conductor is a conductive winding 1004 that includes multiple wires or conductive strands, and is encapsulated in, embedded in, or otherwise coupled to a matrix 1002. In some cases (not shown), the conductive winding 1004 is coupled to an exterior surface of a substrate.

Figure 10B:
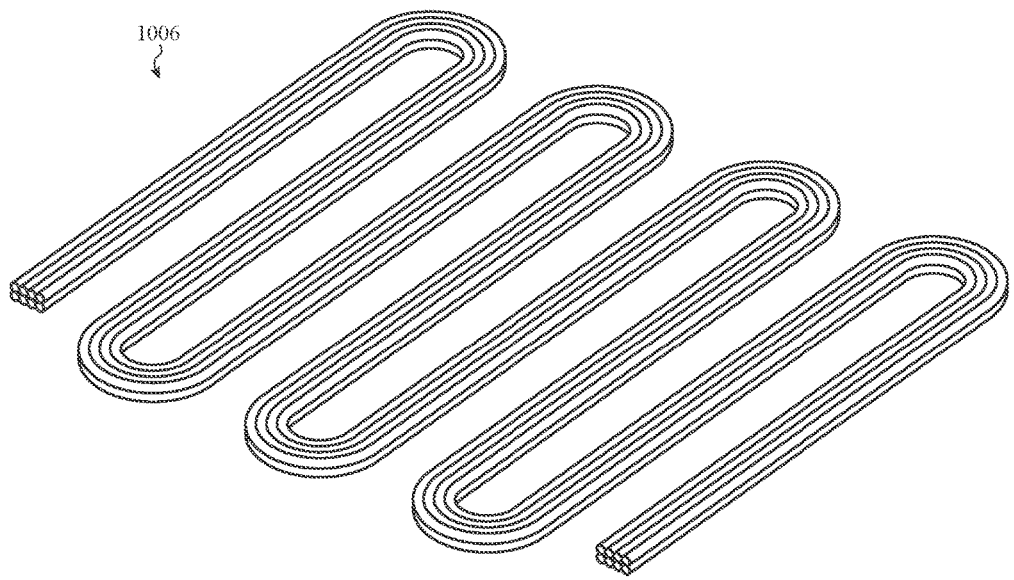
FIGS. 10B-10C show example conductors of the conductive component of FIG. 10A.
Figure 10C:
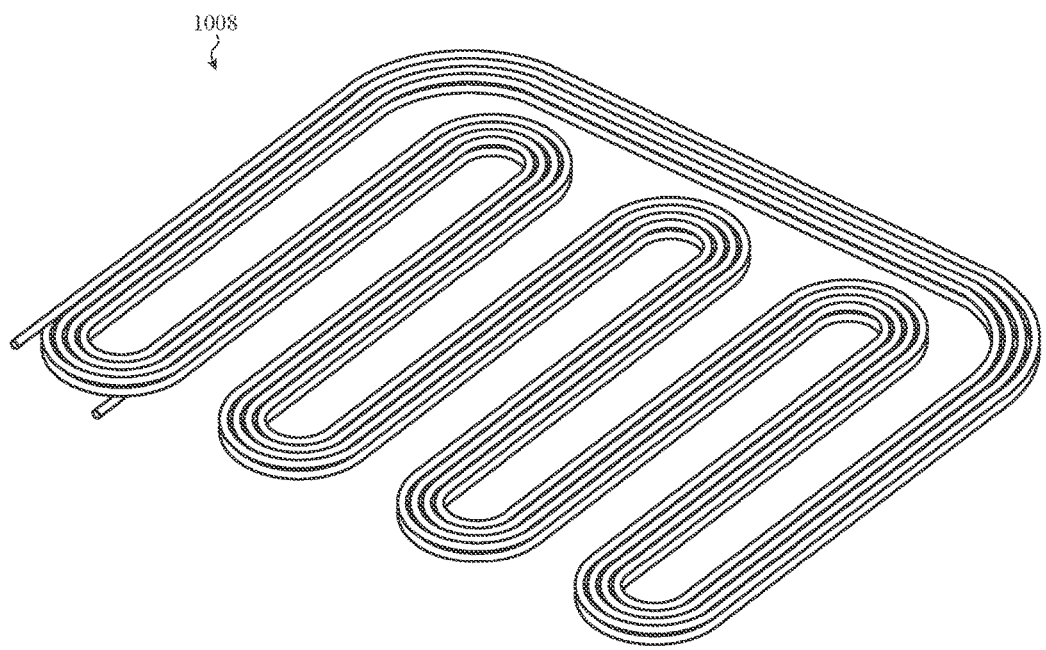

The conductive winding 1004 may have any appropriate structure or shape. For example, as shown in FIG. 10B, the conductive winding 1006 (which is an example of the conductive winding 1004) may include a plurality of insulated or jacketed wires formed into a serpentine shape. As another example, as shown in FIG. 10C, a conductive winding 1008 (which may have the same or similar cross-section as the conductive winding 1004) may include one insulated or jacketed wire formed into a continuous loop with a serpentine portion. Because the continuous loop configuration of FIG. 10C has only two wire ends, while the multiple-wire winding 1006 of FIG. 10B has eight total wire ends, the continuous loop configuration may require fewer or smaller electrical connections between a power source and the winding. On the other hand, the multiple-wire winding 1006 does not require a return path for each loop of wire, and as such may have a smaller footprint for the same number of conductive segments than the continuous loop configuration. Of course, the conductor 1004 (or conductive winding) may have other loop shapes, structures, wire counts, wire sizes, wire materials, and the like.

Figure 11A:
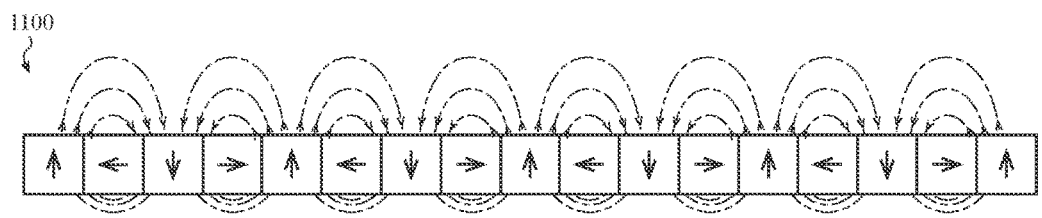
FIGS. 11A-11B show partial cross-sectional views of example magnetic components of the haptic actuator of FIG. 1.
Figure 11B:
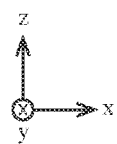
Figure 11B:
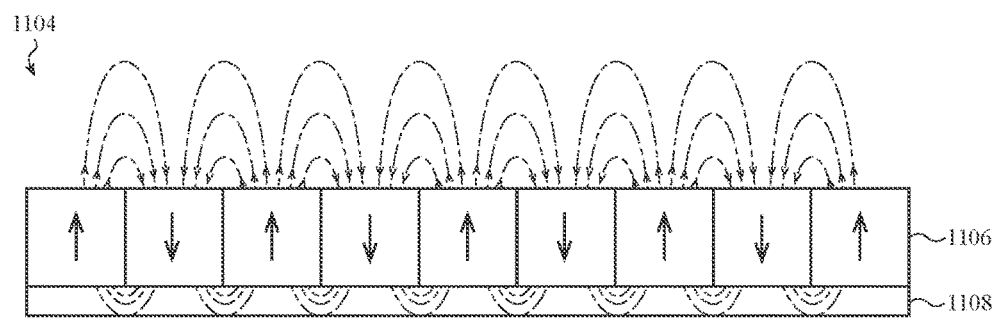

FIGS. 11A-11B show cross-sectional views of example magnetic components 1100 and 1104, respectively. The magnetic components 1100 and 1104 may be similar to, or may be embodiments of, the magnetic component 406 described above. In FIG. 11A, the magnetic component 1100 is a Halbach array including multiple magnetic beams having polarities that work together to propagate a stronger magnetic field on one side of the magnetic component 1100 than the other. More particularly, the Halbach array produces a magnetic field from the surface that faces a conductive component (e.g., the conductive component 404, FIG. 4), and produces no or only a small magnetic field from the surface that faces away from the conductive component.

In FIG. 11B, the magnetic component 1104 includes magnetic beams 1106 (e.g., similar to the magnetic beams 702, FIG. 7), and a ferrous plate 1108 positioned on one side of the magnetic beams. For example, the ferrous plate 1108 may be coupled to the magnetic beams on a side of the magnetic beams that faces away from a conductive component (e.g., the conductive component 404, FIG. 4). Similar to the operation of the Halbach array, the ferrous plate 1108 may direct magnetic flux through its body, thus reducing or eliminating the magnetic field from the surface that faces away from the conductive component.

By reducing or substantially eliminating the magnetic field on one side of the magnetic components 1100, 1104, effects of the magnetic field on surrounding components may likewise be reduced or eliminated. For example, components such as radios (e.g., WiFi, Bluetooth, cellular, etc.), memory, processors, and the like, may be sensitive to magnetic fields. By reducing or eliminating unnecessary magnetic fields emanating from the magnetic component, a haptic actuator 106 can be positioned near such components without negatively affecting them.

Figure 12:
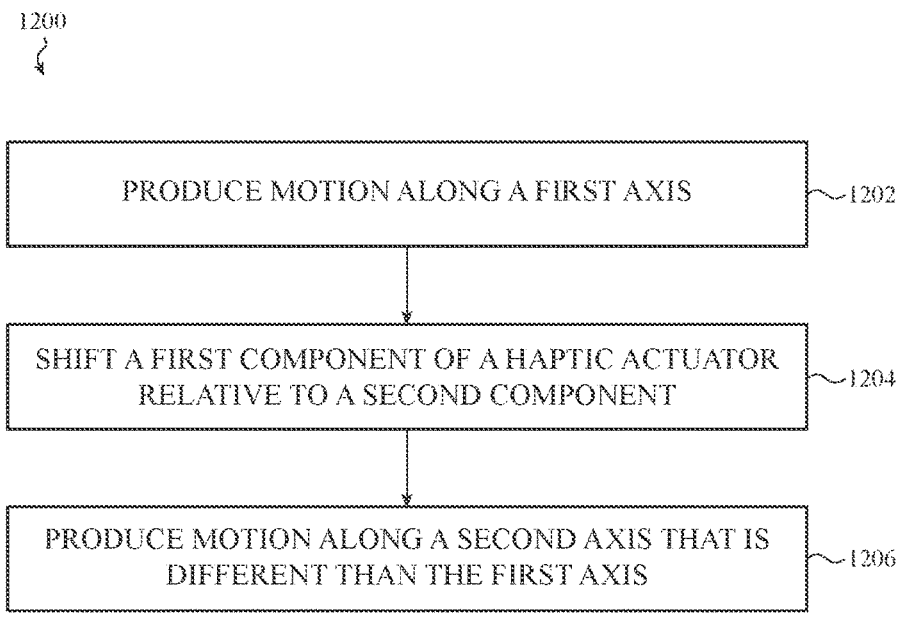
FIG. 12 shows a flow chart of a method of operating the haptic actuator of FIG. 1.

FIG. 12 is a flow chart of a method 1200 of operating a haptic actuator, such as the haptic actuator 106 described above. At operation 1202, the haptic actuator produces motion along a first axis. For example, a current may be passed through a conductor of the haptic actuator to cause motion along a first axis (e.g., along an X axis, as shown in the figures).

The current causing the motion along the first axis may be an alternating current, such that the motion is an oscillating or vibrating motion along the first axis. In some cases, the current is a direct current, producing a Lorentz force in only one direction, thereby producing a haptic impulse or "pop," as described above. The motion along the first axis may be used to provide information or feedback to a user of an electronic device. For example, motion (e.g., vibration) along the first axis may indicate an incoming call or message. As another example, a haptic impulse along the first axis may be used to indicate a navigation direction to a user. More particularly, when a device such as a smart watch or smart phone is providing turn-by-turn directions to a user (e.g., for walking, driving, or cycling), an impulse in one direction may direct the user to turn in one direction, and an impulse in the opposite direction may direct the user to turn in the opposite direction. Other information or feedback may also be indicated by the motion along the first axis.

At operation 1204, a first component of the haptic actuator is shifted relative to a second component of the haptic actuator. Shifting the first component of the haptic actuator relative to the second component may be achieved by causing an actuator (e.g., the actuator 408, FIG. 4) to move one or both of the first and second components.

As described above, a component of the haptic actuator may be shifted relative to another component such that the net direction of magnetic flux through a conductor changes, resulting in a change in the direction of the Lorentz forces that are produced on the conductor when a current is passed through the conductor. In some cases, a component that includes the conductor (e.g., the conductive component 404, FIG. 4) is shifted relative to a component that includes a magnet (e.g., the magnetic component 406, FIG. 4), while in other cases, the component that includes the magnet is shifted relative to the component that includes the conductor. In some cases, both the conductive and magnetic components are moved to achieve the desired relative positions.

At operation 1206, the haptic actuator produces motion along a second axis that is different than the first axis (e.g., along a Z axis, as shown in the figures). More particularly, the motion may be produced by causing a current to be passed through a conductor of the haptic actuator. Similar to the motion along the first axis, the motion along the second axis may be an oscillating or vibrating motion, or a haptic impulse or "pop." The motion along the second axis may be used to provide information or feedback to a user of an electronic device that is different than the information or feedback provided via the motion along the first axis. For example, motion (e.g., a vibration or an impulse) along the second axis may be used to provide touch feedback via a touch screen, button, or other touch sensitive input. For example, when a user touches or presses on a touch screen, the haptic actuator may move along a direction that is substantially perpendicular to the plane of the touch screen. This motion may cause a tactile output via the touch screen to indicate that the input has been registered, and may be perceived as a clicking sensation similar to a mechanical button.

The examples of the information provided by the motion in the first and second directions are provided for illustration purposes. In various embodiments, different information or feedback may be provided or indicated by the motion in the different directions. For example, an oscillation along the first axis (e.g., parallel to a plane of a touch screen) may provide haptic response to a touch screen input, while an oscillation along the second axis (e.g., perpendicular to a plane of a touch screen) may indicate an incoming call or message. The motions described herein may provide any other information as well.

Figure 13:
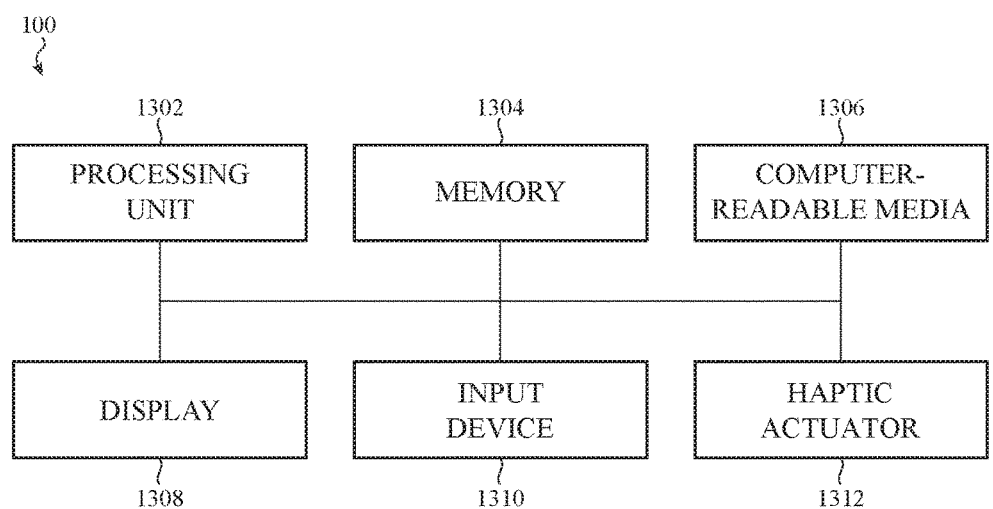
FIG. 13 shows example components of an electronic device.

FIG. 13 depicts an example electronic device having a haptic actuator. The schematic representation depicted in FIG. 13 may correspond to components of the electronic devices described above, including the device 100 depicted in FIG. 1. However, FIG. 13 may also more generally represent other types of devices that are configured to use a haptic actuator as described herein, such as the devices 200, 300 depicted in FIGS. 2-3.

As shown in FIG. 13, the device 100 includes a processing unit 1302 operatively connected to computer memory 1304 and computer-readable media 1306. The processing unit (or processor) 1302 may be operatively connected to the memory 1304 and computer-readable media 1306 components via an electronic bus or bridge. The processing unit 1302 may include one or more computer processors or microcontrollers that are configured to perform operations in response to computer-readable instructions. The processing unit 1302 may include the central processing unit (CPU) of the device. Additionally or alternatively, the processing unit 1302 may include other processors within the device including application specific integrated circuit (ASIC) and other microcontroller devices.

The memory 1304 may include a variety of types of non-transitory computer-readable storage media, including, for example, read access memory (RAM), read-only memory (ROM), erasable programmable memory (e.g., EPROM and EEPROM), or flash memory. The memory 1304 is configured to store computer-readable instructions, sensor values, and other persistent software elements. Computer-readable media 1306 also includes a variety of types of non-transitory computer-readable storage media including, for example, a hard-drive storage device, solid state storage device, portable magnetic storage device, or other similar device. The computer-readable media 1306 may also be configured to store computer-readable instructions, sensor values, and other persistent software elements.

In this example, the processing unit 1302 is operable to read computer-readable instructions stored on the memory 1304 and/or computer-readable media 1306. The computer-readable instructions may adapt the processing unit 1302 to perform operations described above, such as causing a haptic actuator to produce motion along multiple different axes in response to multiple different inputs, operational states, or other triggering events, as well as causing the haptic actuator to move between various operating modes in which motion is produced along the different axes. The computer-readable instructions may be provided as a computer-program product, software application, or the like.

As shown in FIG. 13, the device 100 also includes a display 1308, which may correspond to the display 104, and an input device 1310. The display 1308 may include a liquid-crystal display (LCD), organic light emitting diode (OLED) display, light emitting diode (LED) display, or the like. If the display 1308 is an LCD, the display may also include a backlight component that can be controlled to provide variable levels of display brightness. If the display 1308 is an OLED or LED type display, the brightness of the display may be controlled by controlling the electrical signal that is provided to display elements.

The input device 1310 is configured to provide user input to the device 100. The input device 1310 may include, for example, a touch sensor, a push button, a touch-activated button, a keyboard, a key pad, or the like. Where the input device 1310 is a touch sensor, the input device 1310 may include a capacitive array of electrodes or nodes that operate in accordance with a mutual capacitance or self-capacitance scheme. The touch sensor may be integrated with one or more layers of a display stack (e.g., one or more cover sheets) to form a touch screen. The touch sensor may also be integrated with another component that forms an external surface of a device to define a touch-sensitive surface.

The device 100 also includes a haptic actuator 1312, which may correspond to the haptic actuator 106, described above. The haptic actuator may be coupled to the processing unit 1302, which may act as a controller to control operations of the haptic actuator 1312. For example, the processing unit 1302 may cause signals to be sent to the haptic actuator 1312 to cause the haptic actuator 1312 to produce motion along a first axis, to shift components of the haptic actuator 1312 relative to one another, to produce motion along a second axis, and the like. The processing unit 1302 may send signals and power directly to the haptic actuator 1312 to control the operations of the haptic actuator 1312, or it may communicate with other components that send signals and power directly to the haptic actuator 1312. For example, the processing unit 1302 may send a request to a power circuit to cause an alternating or direct current to be applied to a conductive winding of the haptic actuator 1312.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Also, when used herein to refer to positions of components, the terms above and below, or their synonyms, do not necessarily refer to an absolute position relative to an external reference, but instead refer to the relative position of components with reference to the figures.

What is claimed is:

1. A haptic actuator, comprising:
a magnet;
a conductor set apart from the magnet by a gap; and
an actuator coupled to the magnet and configured to move the magnet between:
a first position in which the conductor is subjected to, from the magnet, a first net magnetic flux having a first direction; and
a second position in which the conductor is subjected to, from the magnet, a second net magnetic flux having a second direction different than the first direction.

2. The haptic actuator of claim 1, wherein:
the magnet is a magnetic beam extending along a longitudinal axis;
the conductor extends along an axis substantially parallel to the longitudinal axis;
the gap is oriented along a plane;
when an alternating current is applied to the conductor when the magnetic beam is in the first position, the conductor oscillates along an axis substantially parallel to the plane; and
when the alternating current is applied to the conductor when the magnetic beam is in the second position, the conductor oscillates along an axis substantially perpendicular to the plane.

3. The haptic actuator of claim 2, wherein:
when the magnetic beam is in the first position, the conductor is substantially centered relative to the longitudinal axis of the magnetic beam; and
when the magnetic beam is in the second position, the conductor is off-center relative to the longitudinal axis of the magnetic beam.

4. The haptic actuator of claim 1, wherein:
the haptic actuator comprises:
an array of magnetic beams each extending along a longitudinal axis; and
a winding comprising a set of conductive segments each substantially parallel to the longitudinal axis of a respective magnetic beam;
the magnet is one of the magnetic beams of the array of magnetic beams; and
the conductor is one of the conductive segments of the winding.

5. The haptic actuator of claim 4, wherein adjacent magnetic beams in the array of magnetic beams have opposite magnetic polarities.

6. The haptic actuator of claim 4, wherein the array of magnetic beams is a Halbach array.

7. The haptic actuator of claim 1, wherein:
the haptic actuator further comprises a substrate; and
the conductor is coupled to the substrate.

8. An electronic device, comprising:
a housing;
a display within the housing; and
a vibrator within the housing, comprising:
 a first actuation component;
 a second actuation component set apart from the first actuation component by a gap;
 a conductive winding coupled to one of the first or second actuation components; and
 an actuator configured to shift the second actuation component relative to the first actuation component;
wherein
when the second actuation component is in a first position relative to the first actuation component, a first current applied to the conductive winding causes the first actuation component to oscillate along a first axis; and
when the second actuation component is in a second position relative to the first actuation component, a second current applied to the conductive winding causes the first actuation component to oscillate along a second axis different than the first axis.

9. The electronic device of claim 8, further comprising a controller operatively coupled to the vibrator and configured to:
cause the first current to be applied to the conductive winding;
cause the actuator to shift the second actuation component relative to the first actuation component; and
cause the second current to be applied to the conductive winding.

10. The electronic device of claim 9, wherein:
the conductive winding is coupled to the first actuation component; and
the second actuation component comprises a magnet.

11. The electronic device of claim 8, wherein the conductive winding has a serpentine shape.

12. The electronic device of claim 8, wherein the actuator comprises a piezoelectric material.

13. The electronic device of claim 8, wherein:
the first actuation component is coupled to a first component of the electronic device via a first compliant member; and
the second actuation component is coupled to a second component of the electronic device via a second compliant member.

14. The electronic device of claim 13, wherein the first and second compliant members comprise elastomeric sheets.

15. A haptic actuator, comprising:
a magnetic component comprising a set of magnets defining a first plane; and
a conductive component defining a second plane substantially parallel to the first plane and comprising a set of conductive segments; wherein
the conductive component is positioned relative to the magnetic component such that each conductive segment is subjected to a net magnetic flux having a direction that is substantially parallel to the first and second planes to produce motion of at least one of the magnetic component or the conductive component in a direction substantially perpendicular to the first and second planes.

16. The haptic actuator of claim 15, wherein:
the conductive component comprises:
 a substrate; and
 a serpentine winding coupled to the substrate; and
the conductive segments are portions of the serpentine winding.

17. The haptic actuator of claim 16, wherein:
each conductive segment is configured to carry an electrical current in a direction opposite an adjacent conductive segment; and
adjacent magnets in the magnetic component have opposite magnetic polarities.

18. The haptic actuator of claim 17, wherein respective conductive segments are substantially centered relative to a boundary between two respective magnets.

19. The haptic actuator of claim 16, wherein the serpentine winding comprises a plurality of wires.

20. The haptic actuator of claim 15, wherein the magnetic component further comprises a ferrous plate coupled to the set of magnets on a side of the magnetic component facing away from the conductive component.

* * * * *